Sept. 29, 1953           A. J. ZABER           2,653,617
PARTS WASHER WITH SAFETY HOSE
Filed July 15, 1946
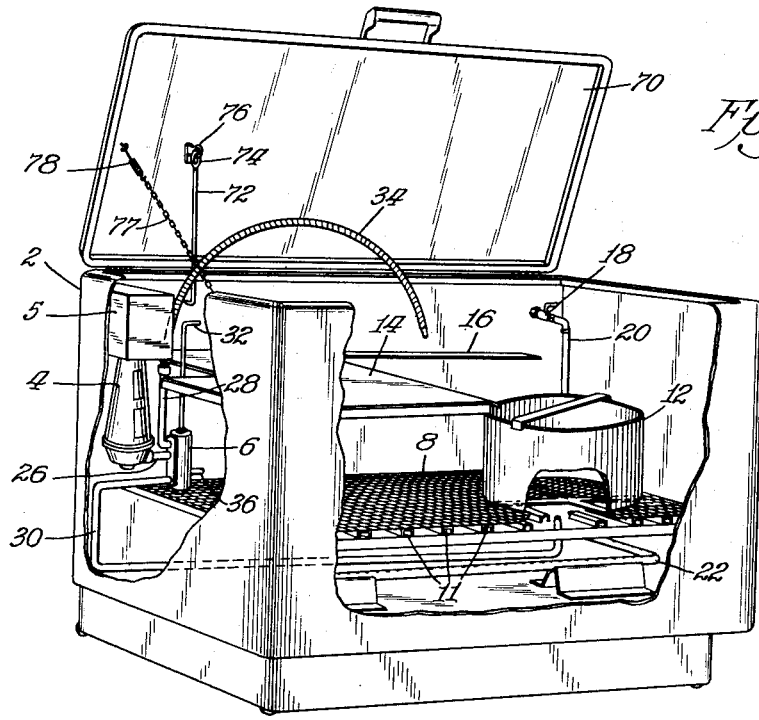
Inventor:
Adolph J. Zaber
By
Stone, Artman & Bisson
Attys.

Patented Sept. 29, 1953

2,653,617

UNITED STATES PATENT OFFICE 2,653,617

PARTS WASHER WITH SAFETY HOSE

Adolph J. Zaber, Evanston, Ill., assignor to Gray-Mills Corporation, Evanston, Ill., a corporation of Illinois Application July 15, 1946, Serial No. 683,586

2 Claims. (Cl. 134—56)

This invention relates to an improved parts washer and particularly to a safety hose mounting in combination with a washer of this type.

A principal object of this invention is to provide a suitable washer having a submerged pump which is capable of circulating the cleaning fluid in a plurality of ways both through the fluid and through a hose. A primary feature of the invention involves the provision of a three-way valve on the outlet of the submerged pump. In one position of the valve, the fluid being circulated is flowed to a point beneath a basket which is adapted to hold small articles to be cleaned and is ejected upwardly so as to perform a desirable cleaning action in the basket. In a second position, the valve directs the pumped fluid in a direction horizontally and generally parallel to the adjacent side wall of the parts washer so as to cause the liquid to circulate around the inside of the washer. In the third position, the valve can direct the fluid through the hose so that it can be directed downwardly from above on parts to be cleaned. The valve also may be turned to another position where all of the outlets thereof are closed.

Another object of the invention is to provide a flexible hose which is sufficiently resistant to bending or twisting in a direction toward the front of the washer so that upon closure of the lid or cover on the washer the nozzle of the hose will be forced downwardly into the washer rather than outside of the tank. This is important since a hose which is not resistant to such torque may be pushed out of the washer in the event the cover should close. Not infrequently, while the pump is circulating an inflammable fluid through the hose, the fluid becomes ignited. On occasion when such a fire initiated, the lid fell down and pushed the end of the hose over the side of the tank. This created an exceedingly hazardous condition, viz., a fire in the tank with the pump pouring inflammable liquid upon the floor outside of the tank.

In accordance with the present invention, this difficulty has been avoided by setting the hose so that it will be turned inwardly of the tank upon fall of the cover. It has now been found that the hose may be set so that when it is pointed into the tank, it is substantially parallel to or turned toward the back of the washer unless it is twisted. With such a setting, the hose will not be pushed out of the tank when the lid drops. This is an especially advantageous discovery since it eliminates the necessity of strapping the hose in the tank.

Another object of the invention is to provide a simple means to ensure use of the fusible link which is used as a safety means adapted to cause the cover to drop down and close the washer in the event of fire. In washers heretofore used in the field, the chain between the washer and the cover is of such length that the cover, which is usually hinged to a side of the washer, may be raised and moved past the vertical and will remain in such position. Not infrequently, these washers are placed in operation without adjustment of the fusible safety link due to carelessness of the operator.

In the present structure, the lid is provided with a suitable spring which resists movement of the cover past the vertical and therefore requires the operator to adjust the fusible link in order to hold the cover open. In a preferred embodiment of this feature as herein shown, the spring remains essentially untensioned when the cover is initially raised, but comes under substantial tension when the cover is raised to a position where the fusible link should be adjusted. For example, movement of the cover may be restrained from movement past the vertical by means of a chain having a spring. The length of the chain and spring is such that the spring is untensioned when the lid is initially raised. However, when the lid is raised to approximately the vertical position, tension is established upon the lid tending to close it unless the fusible link is placed in an operative position holding the lid open.

The above constitute some of the features and objects of the present invention, others of which will become apparent by reference to the following disclosure taken with reference to the accompanying diagrammatic drawings in which Fig. 1 is an isometric view, with the walls partially broken away, of a washer of the type herein contemplated;

Fig. 2 is a plan view of the washer illustrated in Fig. 1 with the top shelf 14 removed;

Fig. 3 is a side elevation of a three-way valve used in the tank to direct the flow of the washing fluid from the pump; and, Fig. 4 is a vertical sectional view of the valve illustrated in Fig. 3 taken along the line 4—4.

As illustrated in the drawings, the washer generally comprises tank 2, a pump 4 driven by a motor in the box 5 for circulation of the cleaning fluid, a valve mechanism 6 for directing flow of the cleaning liquid from the pump to desired parts of the tank and various conduits as hereinafter discussed for conveying the liquid to different parts of the tank.

In the operation of a washer of this type, materials to be cleaned, such as greasy or oily gears, engine blocks or other machines or machine elements, are placed in the tank, the tank partially filled with a suitable liquid organic degreasing solvent and the liquid circulated and agitated in order to dissolve or otherwise remove grease, oil or other foreign matter from the articles to be cleaned. The present apparatus is particularly advantageous since it is capable of effecting a number of types of circulation and agitation which may be used at the option of the washer operator as the washing operation is being conducted.

The washer is provided with a rigid screen 8 which is supported above the tank bottom by ledges 10 in the end walls of the tank and supports 11 which extend laterally across the tank and are supported by ledges (not shown), on the side walls of the tank. This screen serves as a support for articles to be washed. The washer also is provided with a removable basket 12 having a foraminous bottom. This basket may be used to accommodate small articles to be washed and may be transferred to various parts of the washer in order to secure changes in the type of turbulence or agitation of the liquid in the basket or the basket itself may be rocked or shaken by the operator in the cleaning liquid in order to secure the required washing.

A shelf 14 extends across the tank and slidably rests upon ledges 16 on the side walls of the tank. This shelf partially covers the washing area of the tank and serves as a support for washed articles. It may be moved longitudinally of the tank and adjusted to any convenient position.

An air inlet valve 18 is provided in the upper end of the tank to supply air through pipe 20 to a pair of perforated pipes 22. Thus the cleaning liquid may aerated and agitated by the introduction of air simply by governing the rate of air introduction.

As previously noted the washer is capable of circulating cleaning liquid in a plurality of ways. The submerged motor operated, centrifugal pump 4 draws in liquid from the tank and supplies the pumped liquid at high velocity to the three way valve 6.

This valve (Figs. 3 and 4) comprises a valve shell or casing 37 which is open at top and bottom and which has an inlet 25 connected to the pump outlet through conduit 26. The valve shell also has outlets 29, 33 and 35 which are connected to conduits 30, 28 and 36 respectively. Within the shell and concentric therewith, a hollow cylindrical valve plug 38 is provided which tightly fits the interior of the shell and is rotatable therein. This plug has ports 48, 50 (shown in dotted line in Fig. 3) and 52 which are capable of alignment with the outlets 33, 29 and 35 respectively and ports 60, 61 and 62 which are capable of alignment with inlet 25 upon proper rotation of the cylinder 38. The plug 38 and valve handle 32 are keyed together and to a bushing 40 by pin 32 which has a flange bearing upon the upper open end of the valve shell so that upon rotation of the valve handle the plug is rotated and the ports aligned with the inlet and outlets in the shell as desired. The interior valve assembly is held in place by a washer 33 which extends across the lower open end of the valve shell and is fastened to the plug by the threaded bolt 46.

It will be apparent from the drawings that the flow of liquid through the valve is controlled by rotation of the valve plug. Thus flow of liquid through conduit 36 may be effected by turning the valve so that the inlet is in alignment with port 62, and port 52 is in alignment with outlet 35. Likewise flow through conduit 28 may be effected by turning the plug so that port 60 is open to the inlet and port 48 is open to outlet 33. Flow through conduit 30 results when port 61 is in alignment with the inlet and port 50 is open to outlet 29. Flow is completely stopped by adjustment of the plug as shown in Fig. 4.

This valve permits several types of fluid circulation. Thus conduit 28 is connected to a flexible hose 34 having a nozzle which delivers the cleaning liquid to a point wherever directed in the tank above or below the liquid level and may be used to project a stream of the cleaning liquid directly against any part to be washed. Conduit 36 on the other hand projects the pumped liquid in a generally horizontal direction under the liquid level while conduit 30 terminates in an upwardly directed nozzle under the liquid level and projects liquid upwardly thereby causing an upward surge of the liquid in the tank.

In use and operation parts to be degreased or otherwise cleaned are placed in the washer on the screen and the washer is filled to a level above the pump intake with a cleaning liquid, usually an organic degreasing solvent. The pump is turned on to circulate liquid, for example through conduit 36, and air is turned on to agitate the liquid. This circulation and air agitation produces turbulence and causes the liquid to wash against the parts and cleanse them of foreign matter clinging thereto. During the operation some of the parts to be washed are placed in the basket 12 and the operator grasps the handle of the basket and angularly oscillates the basket to increase the flow of liquid against the surface of the parts.

In order to facilitate further washing action of the liquid, the valve is set to deliver liquid to the upwardly turned nozzle connected to conduit 30. This liquid is ejected upwardly beneath the liquid level and produces an upward surge of the cleaning liquid which is extremely effective in accomplishing a cleaning operation. During this operation the basket may be placed over the upwardly turned nozzle to facilitate cleaning of the parts therein.

If the parts to be cleaned are large, the basket may be dispensed with and the parts rested upon the screen and subjected to the turbulent flow of the liquid through the conduits 30 or 36 and to air agitation. These parts may be moved from time to time to aid access of the liquid to the parts.

Whenever necessary the parts may be further washed by projecting a stream of the cleansing liquid against the parts through the flexible hose 34. For example, large parts or basket containing small parts may be placed upon the sliding shelf 14 and the stream of cleaning liquid from hose 34 played directly upon the parts or particular portions thereof to facilitate cleaning. The position of the hose and the direction of flow may be conveniently directed to any portion of the tank and the hose will remain in the adjusted position as is characteristic of flexible type metal hoses.

The fire hazard is great when washers of the type described are used in connection with an inflammable cleaning liquid. The present washer is provided with certain new safety devices adapted to avoid certain difficulties encountered in conventional washers. Frequently the washing is effected using an inflammable cleaning liquid.

Consequently washers of this type have been provided with a cover or lid 70 which is held open during washing but which leans toward the front and bears upon a strut 72 having a fusible link 74 which is hooked to the cover by hook 76. In the event of fire in the washer the link melts and disconnects the strut which drops into the washer thus causing the lid to drop closing the washer and extinguishing the fire.

In practice it is frequently found that operators through carelessness or inadvertence move the lid past the vertical and leans backward and fail to adjust the fusible link. With inflammable cleaning liquids this is very dangerous.

The present washer provides a simple means of avoiding this difficulty. The cover which is hinged to the back of the washer also is attached to a chain which limits the degree by which the lid may be opened. A spring 78 is provided in the chain and the chain length and spring adjustment are such that the lid is always moved from a vertical position to the closing position. Thus when the spring has been opened to a point near the point where adjustment of the fusible link is in order, the spring comes under tension and the operator is reminded and required to set the fusible link in order to hold the lid open.

Upon occasion fire has broken out while the liquid is circulating through the flexible hose. In previous washers the lid, operating by virtue of the fusible link, has on occasion dropped and has pushed the hose out of the tank thus resulting in the extremely hazardous condition of a fire in the tank with the pump pouring inflammable liquid on the floor. In the present washer this difficulty is avoided by clamping or setting the base of the flexible hose where it connects to conduit 28 so that the hose resists tendency to twist out of the tank. By setting the hose so that the inner end which is connected to conduit 28 is resistant toward bending or twisting toward the front of the washer it is found that the hose is always turned inwardly of the tank when the lid drops. To effect this result the hose while it extends across and downwardly into the tank, is generally set so that when the hose is untwisted and unless it is twisted toward the front of the tank it turns toward or is parallel to the back of the tank or at least extends in the general direction of the side of the tank and away from the front thereof. The exact setting of the hose depends upon the width of the tank and the distance between the inlet end of the hose and the front of the tank. By positioning the hose so that the portion of the inlet end can not be substantially twisted toward the front of the washer when the hose is disposed generally in a direction toward a side thereof the hose will be forced into the tank when the lid falls even though the discharge end of the hose may be twisted to a point adjacent to the front of the tank.

Although the present invention has been described with reference to the specific details of certain embodiments thereof it is not intended that such details shall be regarded as limitations upon the scope of the invention except insofar included in the accompanying claims.

What is claimed:

1. A metal parts washer comprising a tank having a rectangular plan configuration, an open top on said tank, a lid mounted on hinges along one side of said open top, a pump mounted inside the tank for circulating inflammable cleansing liquids, and a flexible delivery hose connected to the outlet of said pump and at a selected distance from its end mounted on that inner side of the tank that supports the lid hinges and near one corner of the tank, said hose at the point of mounting being directed upwardly and having a rigidity and a length such that it arches through the open top adjacent the lid with its end pointed downwardly, the length of the free end of the hose being less than the distance from its mounting and that point on the edge of the tank's open top toward which the hose is directed.

2. A metal parts washer comprising a tank having an open top, a lid mounted on hinges on one side of said top, a heat-fusible assembly mounted between the tank and the lid for supporting the lid at an angle of less than 90 degrees with the plane of the opening, a spring interconnected between the lid and the tank for urging the lid against the heat-fusible assembly, a pump mounted inside the tank for circulating inflammable cleansing liquids, a flexible delivery hose connected to the outlet of said pump and at a selected distance from its end mounted adjacent that side of the tank wall that supports the lid, said hose at the point of mounting being directed upwardly and having a rigidity and a length such that it arches through the open top adjacent the lid with its end pointed downwardly, its free length from its mounting being less than the distance between the hose mounting and the point on the edge of the tank's open top toward which the hose is directed.

ADOLPH J. ZABER.

References Cited in the file of this patent

UNITED STATES PATENTS

| Number | Name | Date |
| --- | --- | --- |
| 575,404 | McMurtry | Jan. 19, 1897 |
| 635,009 | Atkinson | Oct. 17, 1899 |
| 1,617,021 | Mitchell | Feb. 8, 1927 |
| 1,713,691 | Curtiss | May 21, 1929 |
| 1,878,685 | Elkington | Sept. 20, 1932 |
| 2,033,812 | Brewer | Mar. 10, 1936 |
| 2,267,069 | Anschicks | Dec. 23, 1941 |
| 2,352,356 | Albertson | June 27, 1944 |
| 2,385,150 | Miller | Sept. 18, 1945 |
| 2,438,654 | Albertson | Mar. 30, 1948 |
| 2,442,272 | Jaffa | May 25, 1948 |

FOREIGN PATENTS

| Number | Country | Date |
| --- | --- | --- |
| 768,752 | France | May 28, 1934 |